(12) United States Patent
Shaw et al.

(10) Patent No.: US 8,213,558 B2
(45) Date of Patent: Jul. 3, 2012

(54) DIGITAL TIMING CORRECTION SYSTEM, METHOD AND APPARATUS

(75) Inventors: Amit Shaw, Bangalore (IN); Bhargava Yalala, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1159 days.

(21) Appl. No.: 12/018,808

(22) Filed: Jan. 24, 2008

(65) Prior Publication Data

US 2009/0190702 A1    Jul. 30, 2009

(51) Int. Cl.
*H04L 7/00* (2006.01)
(52) U.S. Cl. ...................................... 375/355
(58) Field of Classification Search ............... 375/354, 375/355, 316, 340
See application file for complete search history.

(56) References Cited

U.S. PATENT DOCUMENTS

| | | | |
|---|---|---|---|
| 6,084,924 A * | 7/2000 | Melas | 375/340 |
| 2002/0127983 A1 * | 9/2002 | Black et al. | 455/135 |
| 2004/0029609 A1 * | 2/2004 | Li | 455/550.1 |
| 2009/0261994 A1 * | 10/2009 | Petrov | 341/61 |

* cited by examiner

*Primary Examiner* — Kevin M Burd
(74) *Attorney, Agent, or Firm* — Prakash Nama; Global IP Services, PLLC (57) ABSTRACT

The method and system of digital timing correction in a digital baseband communication system is disclosed. In one embodiment, a method includes receiving samples at a predetermined time interval based on a current clock signal of a receiver clock, reading in a prompt sample of the received samples and a successor sample of the received samples based on a control signal, interpolating a projected sample based on the prompt sample, the successor sample and a predetermined time offset, determining the time offset for interpolation, by accumulating sampling frequency offset between the receiver clock and a reference clock, relative to a sample timing of the prompt sample, resulting in an interpolated data sample rate reduced by an integer multiple factor compared to a received sample rate and receiving a next sample of the received samples based on the current clock signal of the receiver clock.

19 Claims, 6 Drawing Sheets

DIGITAL TIMING CORRECTION SYSTEM, METHOD AND APPARATUS

FIELD OF THE INVENTION

The present invention relates to receivers and transmitters and more specifically relates to a digital timing correction associated with digital signal processing.

BACKGROUND

Digital signal processing is the basis for many technology areas. These areas include, for example, digital communication, audio, multimedia, and video. Using digital signal processing, analog data is converted into digital data. The analog data may be sampled at discrete intervals generated by a sampling clock that are carefully chosen to ensure an accurate representation of an original analog signal. The sampling clock may have inaccuracy in its frequency which results in a drifting timing offset across samples from an ideal sample interval.

This inaccuracy in the sampling clock, however, may require digital timing correction to correct the drifting timing offsets between the samples to recover the accurate representation of the analog signal. Sometimes, an oversampled clock may be employed to generate higher quality results in the digital sampling correction. Interpolation between neighboring samples may be used to attempt correction of the drifting timing offsets. A base sample used for the interpolation may have to be shifted accordingly so the interpolation is performed between the samples. Conventionally, this logic has been implemented using, for example, a buffer and the address generation logic for the neighboring samples for the interpolation. If a base sample is shifted, a read pointer in the buffer is shifted accordingly to permit selection of a correct sample for the interpolation.

Depending on sampling frequency offset present in the samples and the length of a packet received, a significant number of shifts may be required. A buffer designed to accommodate the number of shifts may result in significant memory requirements, depending on the timing offset and the packer size. For continuous transmission operations, such requirements may not be feasible as this could necessitate significant memory requirements.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system and apparatus of a digital timing correction in a digital baseband communication system are disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
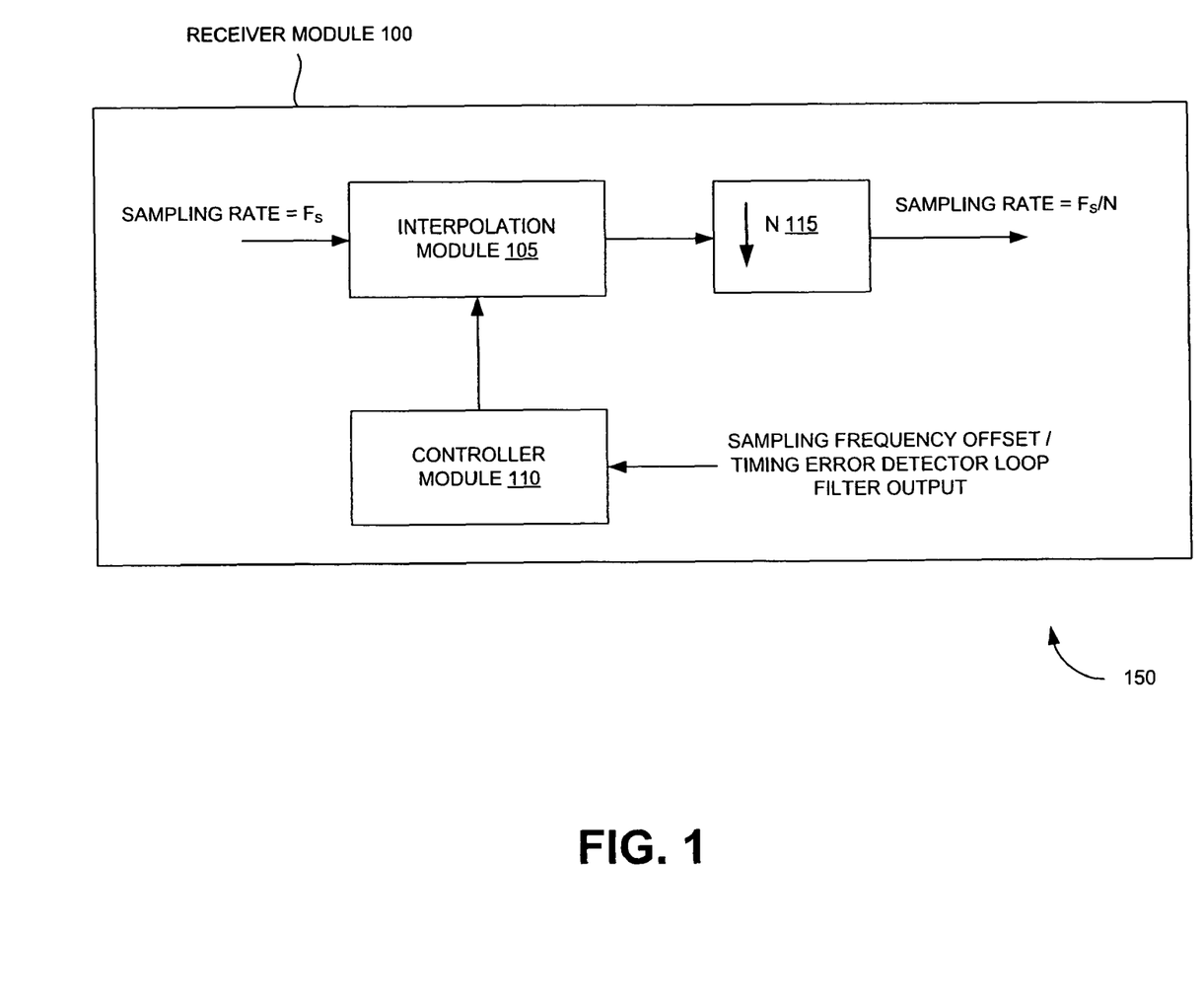
FIG. 1 illustrates a high level block diagram depicting digital timing correction in an oversampled digital baseband communication system, according to one embodiment.

FIG. 1 illustrates a high level block diagram 150 depicting digital timing correction in an oversampled digital baseband communication system, according to one embodiment. Particularly, FIG. 1 illustrates a receiver module 100, an interpolation module 105, a controller module 110 and a downsampler 115.

In operation, the receiver module 100 having a receiver clock receives samples at a predetermined time interval (e.g., at a sampling rate $F_s$) based on a current clock signal of the receiver clock. For example, the receiver module 100 refers to a receiving end in the digital baseband communication system. Further, the receiver module 100 reads in a prompt sample (e.g., the prompt sample 205 of FIG. 2) and a successor sample (e.g., the successor sample 210 of FIG. 2) of the received samples based on a control signal. The interpolation module 105 interpolates a projected sample based on the prompt sample and the successor sample of the received samples, and a predetermined time offset. In one embodiment, the interpolation module 105 applies a simple linear interpolation to obtain the projected sample according to the equation:

$$y(nT_S) = x(nT_S) + \mu \cdot (x((n+1)T_s) - x(nT_S))$$

wherein x is the received sample, $y(nT_S)$ is the projected sample sampled at time index n, $x(nT_S)$ is the prompt sample sampled at time index n, $x(n+1)T_S$ is the successor sample sampled at time index n+1 and $\mu$ is the predetermined offset between $y(nT_S)$ and $x(nT_S)$. In another embodiment, the interpolation module 105 can apply a higher order interpolation circuit to obtain the interpolation of the projected sample.

In some embodiments, the controller module 110 determines the time offset by accumulating sampling frequency offset between the receiver clock and a reference clock, of the projected sample relative to a sample timing of the prompt sample of the received samples. One skilled in the art will recognize that a timing error detector loop filter output can also be considered for the accumulation of the timing offset. In these embodiments, the controller module 110 determines if the accumulated timing offset is less than the sample timing of the prompt sample, greater than the sample timing of the successor sample, or in between the sampling time of the prompt sample and the successor sample. Based on the accumulated timing offset, the controller module 110 generates accordingly, a control signal to select a next prompt and a next successor samples for interpolation.

In the example embodiment illustrated in FIG. 1, the interpolation module 105 is followed by the downsampler 115 to down sample explicitly to the required sample rate (i.e., Nyquist rate). In other words, down sampling is done after interpolation such that the interpolated data sample rate is reduced by an integer multiple factor (N) (i.e., Fs/N) compared to the received input sample rate ($F_s$), where N is downsampling factor and an integer greater than 1. It can be noted that, the down sampling can be implemented implicitly by generating a control signal to the interpolation module 105 to perform interpolation at appropriate time interval.

In some embodiments, the receiver module 100 receives in a next sample of the received samples based on the generated clock signal of the receiver clock. In these embodiments, the receiver module 100 reads in a next prompt sample and a next successor sample of the received samples based on the generated control signal.

Figure 2:
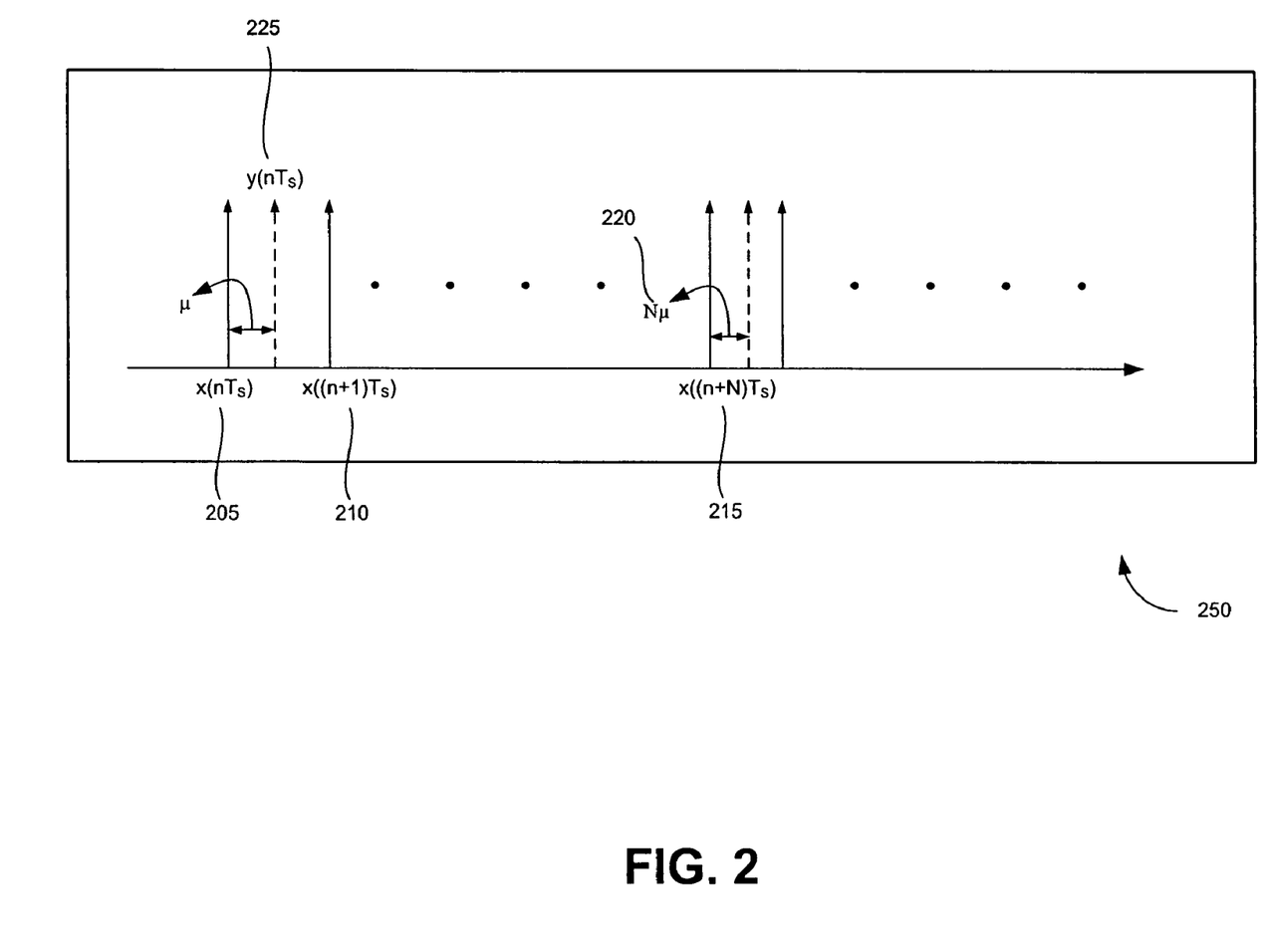
FIG. 2 illustrates a timing offset drift in the received samples in comparison with reference samples of the receiver module of FIG. 1, according to one embodiment.

FIG. 2 illustrates a timing offset drift in the received samples in comparison with reference samples of the receiver module 100 of FIG. 1, according to one embodiment. Particularly, FIG. 2 illustrates samples received at N predetermined time intervals (e.g., $nT_S$, $(n+1)T_S$ ... $(n+N)T_S$ and so on).

As illustrated in FIG. 2, $x(nT_S)$ 205 is a prompt sample sampled at time index n. $x((n+1)T_s)$ 210 is a successor sample sampled at time index n+1. $y(nT_S)$ 225 is a projected sample sampled at time index n. $x((n+N)T_s)$ 215 is a sample received at the receiver module 100 which is sampled at time index n+N. Nμ 220 is a predetermined time offset for $N^{th}$ sample. It can be noted from FIG. 2 that frequency offset between a clock of a digital to analog converter (DAC) at a transmitter and a clock of an analog to digital converter (ADC) at a receiver can cause drifting timing offset in the received samples at the ADC output compared to the samples (e.g., reference/transmitted samples) at the DAC input.

Due to the frequency offset between the transmitter DAC and the receiver ADC, the timing offset value increases or decreases depending on the sign of the frequency offset. Hence, it is desirable to correct the drifting time offset in the received samples to generate samples at accurate time intervals. This can be resolved through correcting the timing offset (e.g., caused due to the frequency difference between the transmitter and receiver clocks) of the samples at the receiver module 100 using the digital interpolation technique illustrated in FIG. 1. Further, in the digital interpolation technique, a simple linear interpolation is applied between the prompt sample 205 and the successor sample 210 to obtain the projected sample 225 according to the equation:

$$y(nT_S)=x(nT_S)+\mu \cdot (x((n+1)T_s)-x(nT_S))$$

wherein μ is the predetermined time offset between $y(nT_S)$ and $x(n)T_S$. One skilled in the art can understand that a higher order interpolation may be used in place of the simple linear interpolation for the digital timing correction in the digital baseband communication system.

Figure 3:
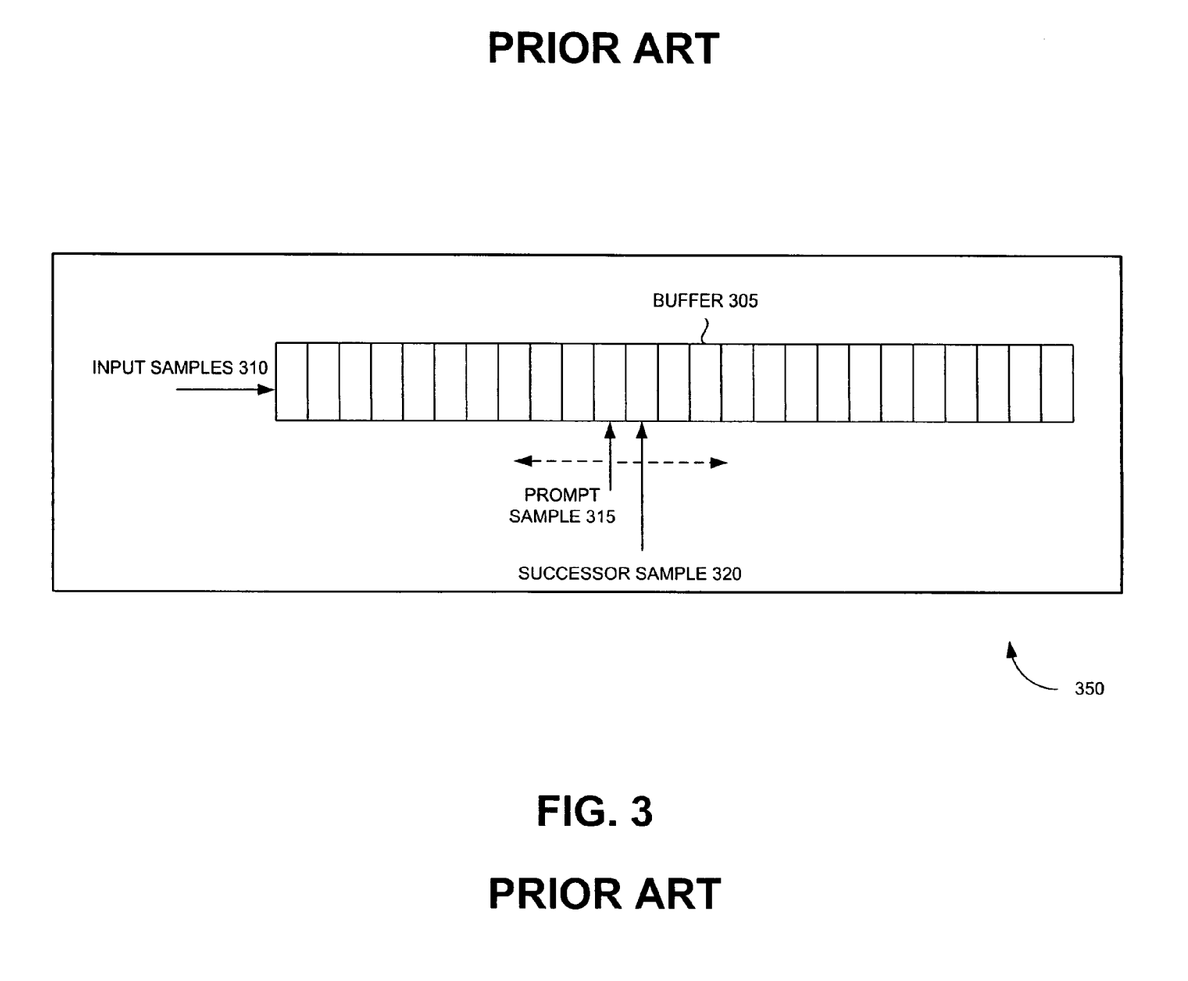
FIG. 3 illustrates a prior art buffer structure operation for shifting samples to enable interpolation during digital timing correction, according to one prior art embodiment.

FIG. 3 illustrates a prior art buffer structure operation for shifting samples 310 to enable interpolation during digital timing correction, according to one prior art embodiment. Particularly, FIG. 3 illustrates the buffer structure 305, input samples 310, a prompt sample 315 and a successor sample 320.

It can be seen that the mismatch of frequency between the clocks of the transmitter DAC and the receiver ADC causes increase or decrease in the timing offset value. In case the timing offset crosses 0 or +1 value, the input samples 310 has to be determined accordingly so that the interpolation is performed between the correct samples. Conventionally, this is performed using the typical buffer 305.

FIG. 3 illustrates the convention structural solution to the scenario in FIG. 1 using the buffer 305 and a controller, without the downsampler 115 of FIG. 1. According to the prior art, the received samples 310 are shifted into the buffer 305. The prompt sample 315 and the successor sample 320 for interpolation are read from a fixed location in the buffer 305, if the accumulated timing offset value is within the range (0-1). For example, when the timing offset value crosses +1, then the prompt and successor sample index are shifted to the left by 1 memory location and the accumulated timing offset is subtracted by 1, so that, the resultant timing offset is within the range (0-1). Alternatively, when the timing offset value decreases below 0, then the prompt and successor sample index are shifted to the right by 1 memory location and the accumulated timing offset is added by 1, so that, the resultant timing offset is within the range (0-1).

As previously discussed, conventional prior art structural solutions to the scenario set out in FIG. 1 may result in significant shifts of the read pointers (prompt and successor sample index) to permit selection of a correct sample for interpolation. To accommodate the significant shifts, significant amounts of memory may be required. Further, FIG. 4 described below, illustrates a control circuit to eliminate huge memory requirements of the conventional structural solutions in one aspect of the present invention.

Figure 4:
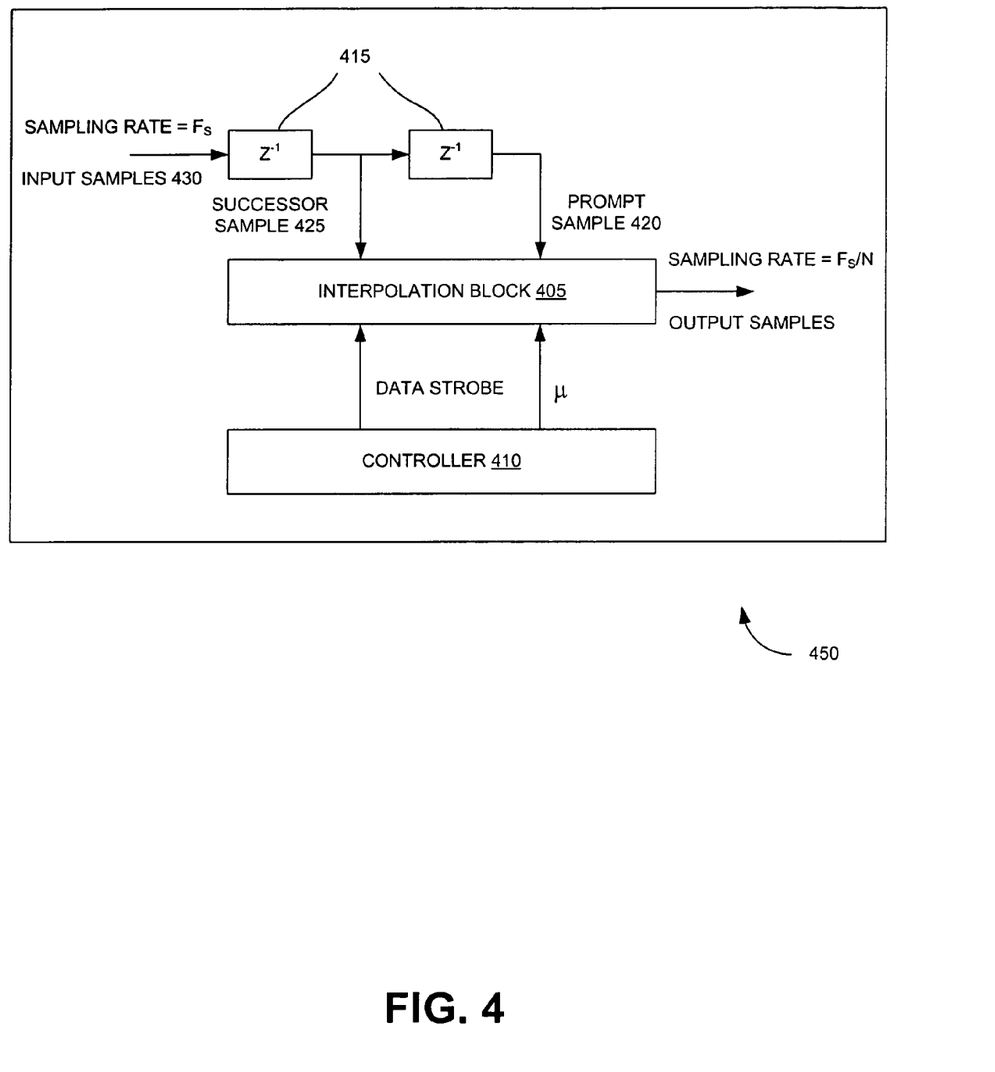
FIG. 4 illustrates a control circuit to strobe in correct samples for interpolation, according to one embodiment.

FIG. 4 illustrates a control circuit 450 to strobe in correct samples for interpolation, according to one embodiment. Particularly, FIG. 4 illustrates an interpolation block 405, a controller 410, delay elements ($Z^{-1}$) 415, a prompt sample 420, a successor sample 425 and input samples 430.

As illustrated in FIG. 4, the samples 430 are inputted to the interpolation block 405 through a series connected delay elements ($Z^{-1}$) 415. In each delay element ($Z^{-1}$) 415, the input samples 430 are delayed by one clock period. As illustrated in FIG. 4, the prompt sample 420 and the successor sample 425 are delayed by one clock period through a delay element ($Z^{-1}$) 415.

In operation, the controller 410 strobes in the prompt sample 420 and the successor sample 425 from the input samples 430 based on a control signal. In one embodiment, strobing in the correct samples (e.g., the prompt sample 420 and the successor sample 425) during sampling eliminates huge memory requirements associated with prior art techniques with the buffer 305, as previously discussed.

The interpolation block 405 interpolates to obtain a projected sample based on the prompt sample 420, the successor sample 425 and a predetermined time offset. In one embodiment, the interpolation block 405 applies a simple linear interpolation to obtain the projected sample according to the equation:

$$y(nT_S)=x(nT_S)+\mu \cdot (x((n+1)T_s)-x(nT_S))$$

wherein x is the received sample, $y(nT_S)$ is the projected sample sampled at time index n, $x(nT_S)$ is the prompt sample sampled time index n, and $x(n+1)T_S$ is the successor sample sampled at time index n+1, and μ is the predetermined time offset between $y(nT_S)$ and $x(nT_S)$.

In some embodiments, the controller 410 determines if an accumulated timing offset of the projected sample is less than a sample timing of the prompt sample 420, greater than a sample timing of the successor sample 425 or in between the sample timing of the prompt sample 420 and the successor sample 425. In one embodiment, if the accumulated timing offset is between the sampling time of the prompt sample 420 and the successor sample 425, the controller 410 normally generates a data strobe control signal to strobe at an integer multiple of the current clock signal of the receiver clock. In another embodiment, if the accumulated timing offset is less than the sample timing of the prompt sample 420, the controller 410 generates the data strobe control signal to strobe one clock earlier than the normally generated data strobe control signal. In yet another embodiment, if the accumulated timing offset is greater than the sample timing of the successor sample 425, the controller 410 generates the data strobe control signal to strobe one clock later than the normally generated data strobe control signal.

In accordance with the one or more embodiments described above, if a µ value lies between 0 and 1, the controller 410 normally generates the data strobe control signal to strobe at an integer multiple of the current clock signal of the receiver clock, if the µ value is less than 0, the controller 410 generates the data strobe control signal to strobe one clock earlier than the normally generated data strobe control signal and adds 1 to the µ value, and if the µ value is greater than 1, the controller 410 generates the data strobe control signal to strobe one clock later than the normally generated data strobe control and subtracts 1 from the µ value. Hence, based on the generated data strobe control signal, the controller 410 strobes in a next prompt sample 420 and a next successor sample 425 of the received samples 430. Further, the control circuit 450 enables reading in the next prompt sample 420 and the next successor sample 425 by the controller 410 based on the generated data strobe control signal of the receiver clock.

It can be noted that, in some embodiments, the interpolation block 405 can also apply a higher order interpolation circuit to obtain interpolation of the projected sample. Thus, the above described control circuit 450 enables strobing in of correct samples for interpolation using the controller 410, thereby eliminating huge memory requirements set out in the conventional structure solutions discussed in FIG. 3. Further, one skilled in the art will appreciate that strobing of the correct samples for interpolation using the controller 410 enables continuous (e.g., uninterruptible) transmission of samples.

Figure 5:
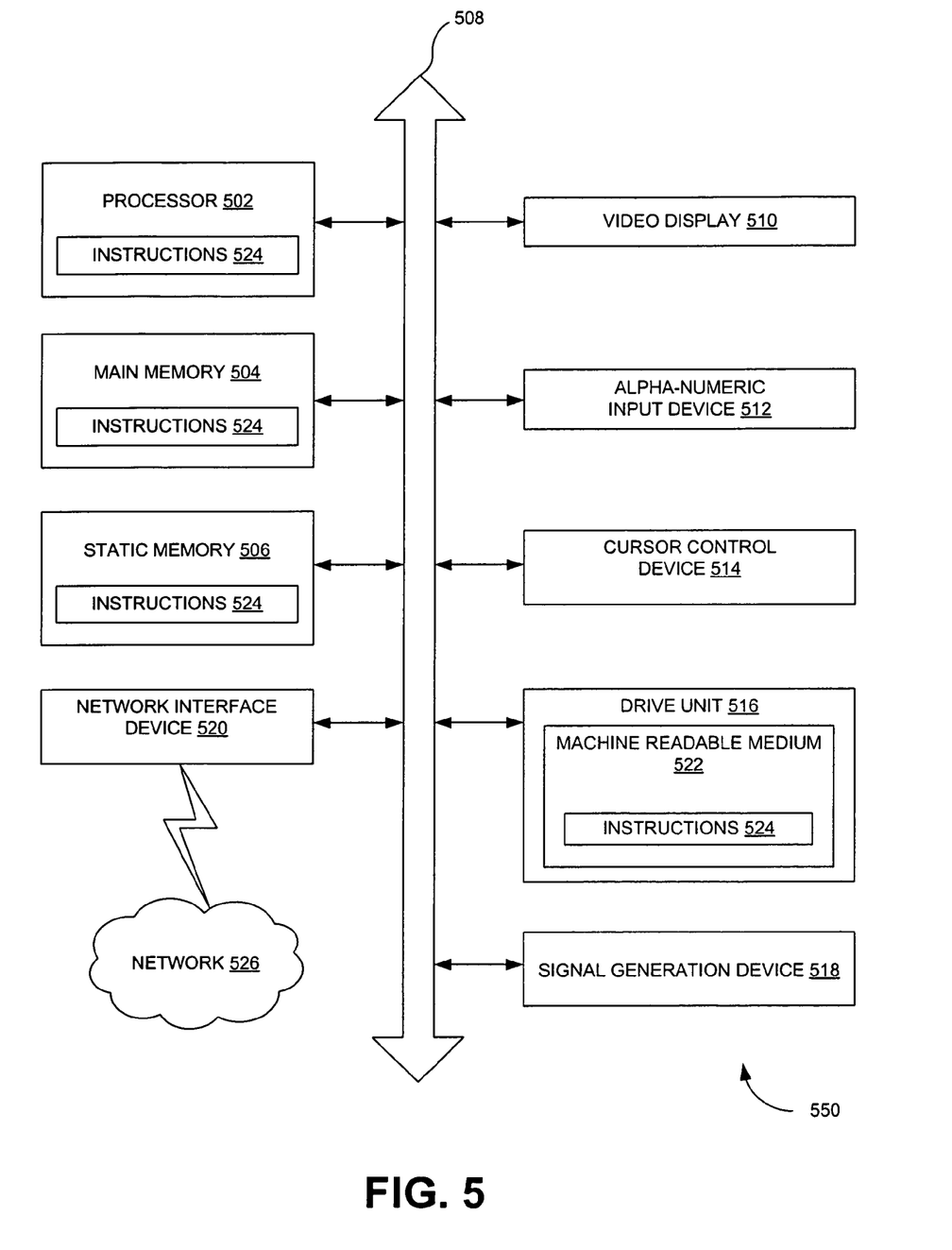
FIG. 5 illustrates a diagrammatic system view of a data processing system in which any of the embodiments disclosed herein may be performed, according to one embodiment.

FIG. 5 illustrates a diagrammatic system view 550 of a data processing system in which any of the embodiments disclosed herein may be performed, according to one embodiment. Particularly, the diagrammatic system view 550 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 550 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

Figure 6:
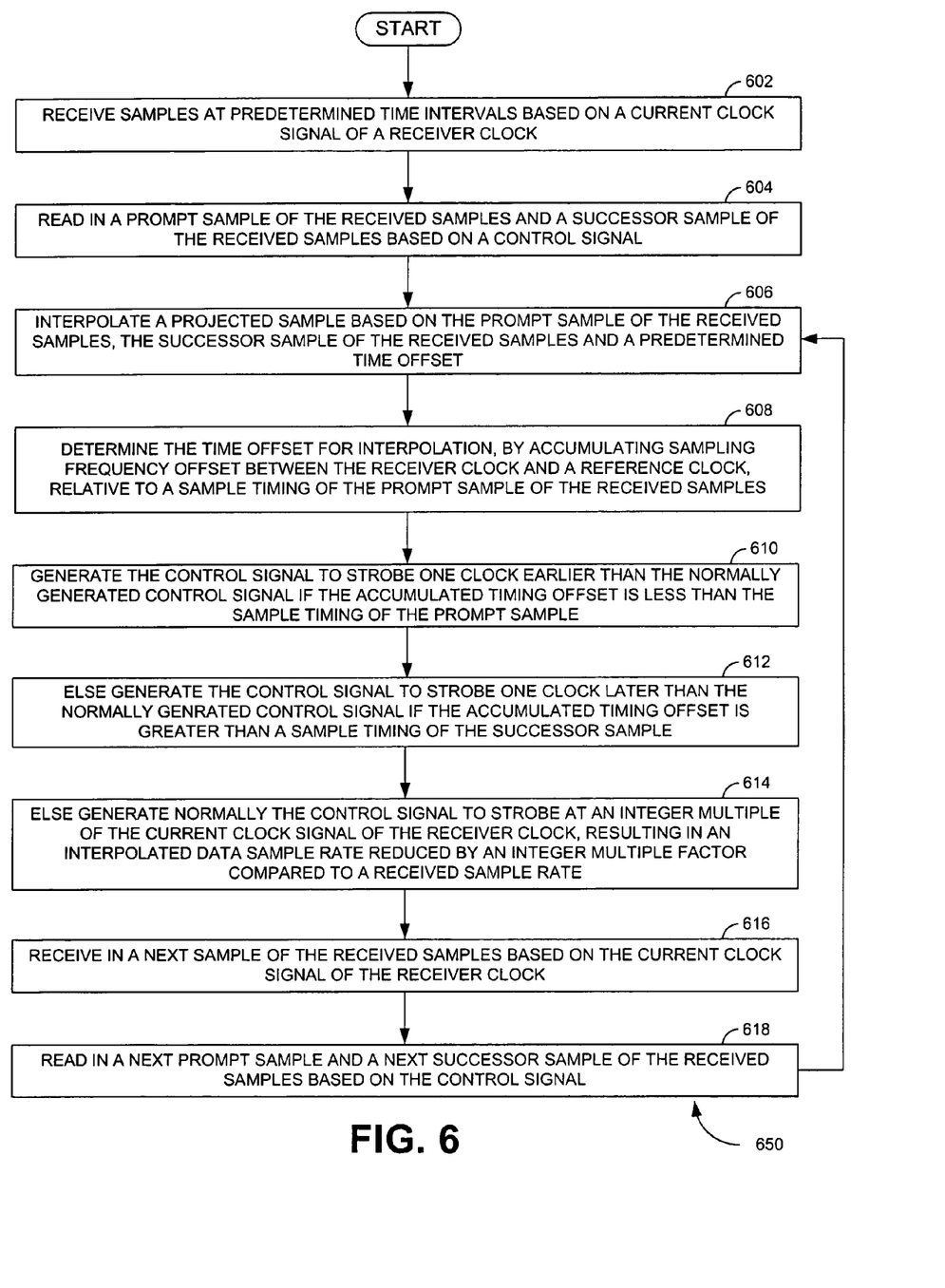
FIG. 6 is a process flow of the digital timing correction in the digital baseband communication system, according to one embodiment.

FIG. 6 is a process flow of digital timing correction in a digital baseband communication system, according to one embodiment. In operation 602, samples 430 of FIG. 4 are received (e.g., at the receiver module 100 of FIG. 1) at a predetermined time interval based on a current clock signal of a receiver clock. In operation 604, a prompt sample 420 of the received samples 430 and a successor sample 425 of the received samples 430 are read in (e.g., by the receiver module 100 of FIG. 1) based on a control signal.

In operation 606, a projected sample is interpolated (e.g., using the interpolation block 405 of FIG. 4) based on the prompt sample 420 of the received samples 430, the successor sample 425 of the received samples 430 and a predetermined time offset. In one embodiment, a simple linear interpolation is applied to obtain the projected sample. In another embodiment, the projected sample can be obtained by applying a higher order interpolation. In operation 608, the time offset for interpolation is determined (e.g., using the controller 410 of FIG. 4) by accumulating sampling frequency offset between the receiver clock and a reference clock, relative to a sample timing of the prompt sample (e.g. 205 of FIG. 2) of the received samples 430.

In operation 610, the control signal is generated (e.g., using the controller 410 of FIG. 4) to strobe one clock earlier than the normally generated control signal if the accumulated timing offset is less than the sample timing of the prompt sample 420. In operation 612, the control signal is generated (e.g., using the controller 410 of FIG. 4) to strobe one clock later than the normally generated control signal if the accumulated timing offset is greater than a sample timing of the successor sample 425.

In operation 614, the control signal is generated normally to strobe at an integer multiple of the current clock signal of the received clock, if the accumulated timing offset is in between the sample timing of the prompt sample and the sample timing of the successor sample, resulting in an interpolated data sample rate reduced by an integer multiple factor compared to a received sample rate. In operation 616, a next sample of the received samples 430 is received in (e.g., at the receiver module 100 of FIG. 1) based on the current clock signal of the receiver clock. In operation 618, a next prompt sample 420 and a next successor sample 425 of the received samples 430 is read in (e.g., by the receiver module 100 of FIG. 1) based on the control signal. The process 650 then is routed back to operation 606 and repeats operations 606-618.

The above-described method provides an efficient hardware structure for digital timing correction used in over sampled digital baseband communication systems. The above-described technique uses digital interpolation to correct timing offset in the samples received in a receiver. In one embodiment, the above technique applies simple linear interpolation between two neighboring samples (i.e., the prompt sample 420 and the successor sample 425) to get output samples. In another embodiment, the above technique applies higher order interpolation to obtain the projected sample. Further, the above described method in the correct samples for interpolation using a control circuit, thereby eliminating huge memory requirements.

The above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   receiving samples at a predetermined time interval through a series connected delay elements based on a current clock signal of a receiver clock;
   strobing in a prompt sample and a successor sample from output of each of the series connected delay elements for interpolation based on a control signal, wherein the control signal is generated by:
   determining a time offset for interpolation, by accumulating sampling frequency offset between the receiver clock and a reference clock, relative to a sample timing of the prompt sample;
   if the accumulated time offset is less than the sample timing of the prompt sample, generating the control signal to strobe one clock earlier than the normally generated control signal;
   else if the accumulated time offset is greater than the sample timing of the successor sample, generating the control signal to strobe one clock later than the normally generated control signal;
   else normally generating the control signal to strobe at an integer multiple of the current clock signal of the receiver clock;
   interpolating a projected sample based on the prompt sample, the successor sample and the predetermined time offset with an interpolated data sample rate reduced by an integer multiple factor compared to a received sample rate; and
   receiving in a next sample of the received samples through the series connected delay elements based on the current clock signal of the receiver clock.

2. The method of claim 1, further comprising:
   applying a simple linear interpolation to obtain the projected sample.

3. The method of claim 2, wherein the simple linear interpolation to obtain the projected sample comprises:

$$y(nT_S) = x(nT_S) + \mu \cdot (x((n+1)T_S) - x(nT_S))$$

wherein x is the received sample, y(nTs) is the projected sample sampled at time index n, x(nTs) is the prompt sample sampled at time index n, x(n+1)Ts is the successor sample sampled at time index n+1, and μ is the predetermined time offset between y (nTs) and x (nTs).

4. The method of claim 3, wherein:
   if a μ value is less than 0, generating the control signal to strobe one clock earlier than the normally generated control signal and adding 1 to the μ value;
   else if the μ value is greater than 1, generating the control signal to strobe one clock later than the normally generated control signal and subtracting 1 from the μ value; and
   else normally generating the control signal to strobe at an integer multiple of the current clock signal of the receiver clock.

5. The method of claim 1, further comprising:
   applying a higher order interpolation to obtain the projected sample.

6. The method of claim 1, further comprising:
   strobing in a next prompt sample and a next successor sample from the output of the series connected delay elements based on the control signal.

7. A non-transitory computer readable medium embodying a set of instructions that, when executed by a computer, causes the computer to perform the method of claim 1.

8. A system, comprising:
   a receiver module having a receiver clock to receive samples at a predetermined time interval through a series connected delay elements based on a current clock signal of the receiver clock and to strobe in a prompt sample and a successor sample from output of each of the series connected delay elements for interpolation based on a control signal, wherein the receiver module comprises:
   a controller module to generate the control signal, wherein the controller module is configured to:
   determine a time offset for interpolation, by accumulating sampling frequency offset between the receiver clock and a reference clock, relative to a sample timing of the prompt sample;
   determine if the accumulated time offset is less than the sample timing of the prompt sample and, if the accumulated time offset is less than the sample timing of the prompt sample, to generate the control signal to strobe one clock earlier than the normally generated control signal;
   determine if the accumulated time offset is greater than the sample timing of the successor sample and, if the accumulated time offset is greater than the sample timing of the successor sample, to generate the control signal to strobe one clock later than the normally generated control signal;
   else to normally generate the control signal to strobe at an integer multiple of the current clock signal of the receiver clock; and
   an interpolation module to interpolate a projected sample based on the prompt sample, the successor sample and the predetermined time offset with an interpolated data sample rate reduced by an integer multiple factor compared to a received sample rate,
   wherein the receiver module to receive in a next sample of the received samples through the series connected delay elements based on the clock signal of the receiver clock.

9. The system of claim 8, wherein the interpolation module further applies a simple linear interpolation to obtain the projected sample.

10. The system of claim 9, wherein the simple linear interpolation to obtain the projected sample comprises:

$$y(nT_S) = x(nT_S) + \mu \cdot (x((n+1)T_S) - x(nT_S))$$

wherein x is the received sample, y(nTs) is the projected sample sampled at time index n, x(nTs) is the prompt sample sampled at time index n, x(n+1)Ts is the successor sample sampled at time index n+1, and μ is the predetermined time offset between y (nTs) and x (nTs).

11. The system of claim 10, wherein:
   if a μ value is less than 0, the control signal is generated to strobe one clock earlier than the normally generated control signal and 1 is added to the μ value;

else if the μ value is greater than 1, the control signal is generated to strobe one clock later than the normally generated control signal and 1 is subtracted from the μ value; and else the control signal is generated normally to strobe at the integer multiple of the current clock signal of the receiver clock.

12. The system of claim 8, wherein the interpolation module further applies a higher order interpolation circuit to obtain the interpolation of the projected sample.

13. The system of claim 8, wherein the receiver module further strobes in a next prompt sample and a next successor sample from the output of the series connected delay elements based on the control signal.

14. A control circuit, comprising:
a controller to strobe in a prompt sample and a successor sample from output of each of a series connected delay elements for interpolation based on a control signal, wherein the controller generates the control signal, wherein the controller module is configured to:
to determine the time offset for interpolation, by accumulating sampling frequency offset between a receiver clock and a reference clock, relative to a sample timing of the prompt sample;
to determine if the accumulated time offset of the projected sample is less than a sample timing of the prompt sample or greater than a sample timing of the successor sample; and
to generate the control signal to strobe one clock earlier than the normally generated control signal if the accumulated time offset is less than the sample timing of the prompt sample;
to generate the control signal to strobe one clock later than the normally generated control signal if the accumulated time offset is greater than the sample timing of the successor sample;
else to normally generate the control signal to strobe at an integer multiple of the current clock signal of the receiver clock; and
an interpolation block to obtain a projected sample based on the prompt sample, the successor sample, and the predetermined time offset, wherein the controller strobes in a next prompt sample and a next successor sample from the output of the series connected delay elements based on the control signal.

15. The control circuit of claim 14, wherein the interpolation block further applies a simple linear interpolation to obtain the projected sample.

16. The control circuit of claim 14, wherein the simple linear interpolation to obtain the projected sample comprises:

$$y(nT_S)=x(nT_S)+\mu \cdot (x((n+1)T_S)-x(nT_S))$$

wherein x is the received sample, y(nTs) is the projected sample sampled at time index n, x(nTs) is the prompt sample sampled at time index n, x(n+1)Ts is the successor sample sampled at time index n+1, and μ is the predetermined time offset between y(nTs) and x(n)Ts.

17. The control circuit of claim 16, wherein:
if a μ value is less than 0, the control signal is generated one clock earlier than the normally generated control signal and 1 is added to the μ value;
else if the μ value is greater than 1, the control signal is generated one clock later than the normally generated control signal and 1 is subtracted from the μ value; and
else the control signal is generated normally at an integer multiple of the current clock signal of the receiver clock.

18. The control circuit of claim 14, wherein the interpolation block further applies a higher order interpolation circuit to obtain interpolation of the projected sample.

19. A control circuit, comprising:
a controller to strobe in a prompt sample and a successor sample from output of each of a series connected delay elements for interpolation based on a control signal; and
an interpolation block to interpolate according to:

$$y(nT_S)=x(nT_S)+\mu \cdot (x((n+1)T_S)-x(nT_S))$$

wherein x is the received sample, y(nTs) is a projected sample sampled at time index n, x(nTs) is the prompt sample sampled at time index n, x(n+1)Ts is the successor sample sampled at time index n+1, and μ is a predetermined time offset between y(nTs) and x(nTs), and to determine if a μ value is less than 0 or greater than 1;
wherein the controller generates the control signal one clock earlier than the normally generated control signal if the μ value is less than 0 and to add 1 to the μ value;
wherein the controller generates the control signal one clock later than the normally generated control signal if the μ value is greater than 1 and to subtract 1 from the μ value;
else the controller generates the control signal at an integer multiple of the current clock signal of the receiver clock; and
wherein the controller to strobe in a next prompt sample and a next successor sample from the output of the series connected delay elements based on the control signal.

* * * * *